(12) United States Patent
    Saavedra

(10) Patent No.: US 9,279,418 B2
(45) Date of Patent: Mar. 8, 2016

(54) POWER GENERATING SYSTEM UTILIZING AMBIENT TEMPERATURE

(71) Applicant: John A. Saavedra, Irmo, SC (US)

(72) Inventor: John A. Saavedra, Irmo, SC (US)

(*) Notice: Subject to any disclaimer, the term of this patent is extended or adjusted under 35 U.S.C. 154(b) by 78 days.

(21) Appl. No.: 14/150,931

(22) Filed: Jan. 9, 2014

(65) Prior Publication Data

US 2015/0192113 A1    Jul. 9, 2015

(51) Int. Cl.
    *F03G 7/06*   (2006.01)
    *F03G 7/00*   (2006.01)
    *F03G 7/04*   (2006.01)
    *F01K 27/00*  (2006.01)

(52) U.S. Cl.
    CPC ............... *F03G 7/06* (2013.01); *F01K 27/005* (2013.01); *F03G 7/005* (2013.01); *F03G 7/04* (2013.01)

(58) Field of Classification Search
    CPC ............ F03G 7/005; F03G 7/04; F03G 7/06; G01K 27/005
    See application file for complete search history.

(56) References Cited

U.S. PATENT DOCUMENTS

| | | | |
|---|---|---|---|
| 2,215,157 A | | 9/1940 | Platzner |
| 3,587,227 A | | 6/1971 | Weingarten |
| 5,375,983 A | * | 12/1994 | Engels ................... 417/379 |
| 8,191,372 B2 | | 6/2012 | Aggarwal |
| 2008/0245068 A1 | | 10/2008 | Bastawros et al. |
| 2012/0017584 A1 | * | 1/2012 | Hudson ................... 60/530 |

FOREIGN PATENT DOCUMENTS

WO       WO 96/02750       2/1996

OTHER PUBLICATIONS

Ice power getting free energy from the expansion of water. Youtube.com (uploaded on Jan. 24, 2011).

* cited by examiner

*Primary Examiner* — Audrey K Bradley

(57) ABSTRACT

The present disclosure provides a system and method for generating power, such as electrical power, using an increased volume of a substance when the substance freezes due to the system's ambient conditions. The increased volume of the substance may be absorbed by a flexible container and flexible container may transfer a hydraulic fluid to a hydraulic line in fluid communication with a hydraulic generator. The hydraulic generator may be configured to generate power using the transferred hydraulic fluid.

10 Claims, 5 Drawing Sheets

POWER GENERATING SYSTEM UTILIZING AMBIENT TEMPERATURE

FIELD

The present disclosure relates generally to a system and method for generating power, such as electrical power, from water or a water solution that freezes due at least in part to an ambient temperature.

BACKGROUND

Worldwide demand for energy, especially electrical energy, or electrical power, continues to grow. Domestic energy prices continue to rise and challenges arising from foreign political instabilities, especially with regard to fossil fuels like crude oil, brings uncertainty into future energy prices. At the same time, by certain accounts, known reserves of fossil fuels like crude oil are declining, and may not be renewed in the foreseeable future.

A percentage of the increased demand in electrical power may come from developing countries attempting to add people to community power supplies, as a measurable percentage of the world's population still lives without access to electrical power. This percentage may correlate closely in certain geographical regions with poverty, illiteracy, reduced life expectancy, infant mortality, unsafe drinking water, crop failure, water-borne diseases, and other negative consequences.

Accordingly, a system and method for generating electrical power would be beneficial. More particularly, a system and method for generating electrical power in a clean and cost effective manner, such as by using a renewable and sustainable energy source would be particularly useful.

SUMMARY

Aspects and advantages of the invention will be set forth in part in the following description, or may be obvious from the description, or may be learned through practice of the invention.

In one exemplary embodiment of the present disclosure, a system for generating electrical power is provided, the system including a first container containing a substance, the substance defining a volume and including water such that when the substance freezes, the volume of the substance increases. The system additionally includes a second container positioned adjacent to or within the first container and including a hydraulic fluid. The second container absorbs at least a portion of the increased volume of the substance when the substance freezes. Additionally, the system includes a hydraulic line in communication with the second container, the hydraulic line including a hydraulic fluid, and the second container configured to transfer a hydraulic fluid to the hydraulic line when the substance freezes. Further, the system includes a hydraulic generator in fluid communication with the hydraulic line, the hydraulic generator configured to generate electrical power using the hydraulic fluid transferred to the hydraulic line.

In another exemplary embodiment of the present disclosure, a system for generating electrical power is provided, the system including a rigid container containing a substance, the substance defining a volume and including water such that when the substance freezes, the volume of the substance increases. The system additionally includes a valve in fluid communication with the rigid container and a hydraulic line in fluid communication with the valve. The hydraulic line is configured to receive at least a portion of the substance from the rigid container through the valve when at least a portion of the substance in the rigid container freezes. Further, the system includes a hydraulic generator in communication with the hydraulic line, the hydraulic generator configured to generate electrical power using the transferred substance in the hydraulic line.

In an exemplary aspect of the present disclosure, a method for generating electrical power using ambient conditions is provided. The method includes freezing a substance using ambient conditions, the substance defining a volume and the volume of the substance increasing as the substance freezes, the substance being positioned within a first container. The method additionally includes compressing a second container including a hydraulic fluid using the increased volume of the substance and transferring hydraulic fluid from the second container to a hydraulic line in fluid communication with the second container. The hydraulic line includes a hydraulic fluid. Additionally, the method includes powering a generator in communication with the hydraulic line using the hydraulic fluid transferred to the hydraulic line.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
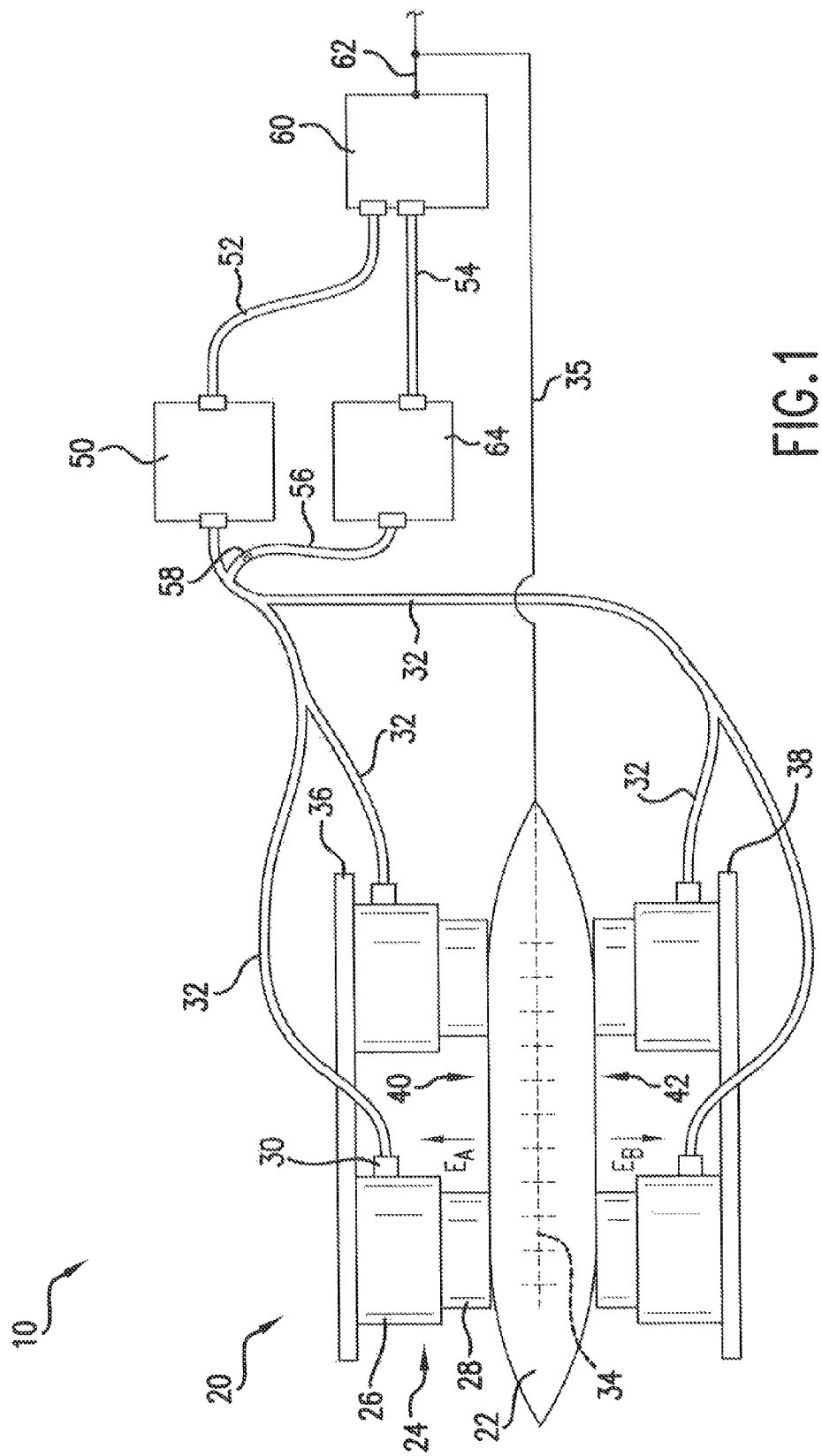
FIG. 1 provides diagrammatic view of a system for generating electrical power using ambient conditions in accordance with an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is related generally to a system and method of generating power, such as electrical power, using ambient conditions. More particularly, the present disclosure is related to a system and method of harnessing the pressure generated from the expansion of water or of a water solution as it freezes to pressurize a hydraulic line and run a hydraulic generator to produce electrical power.

Figure 2:
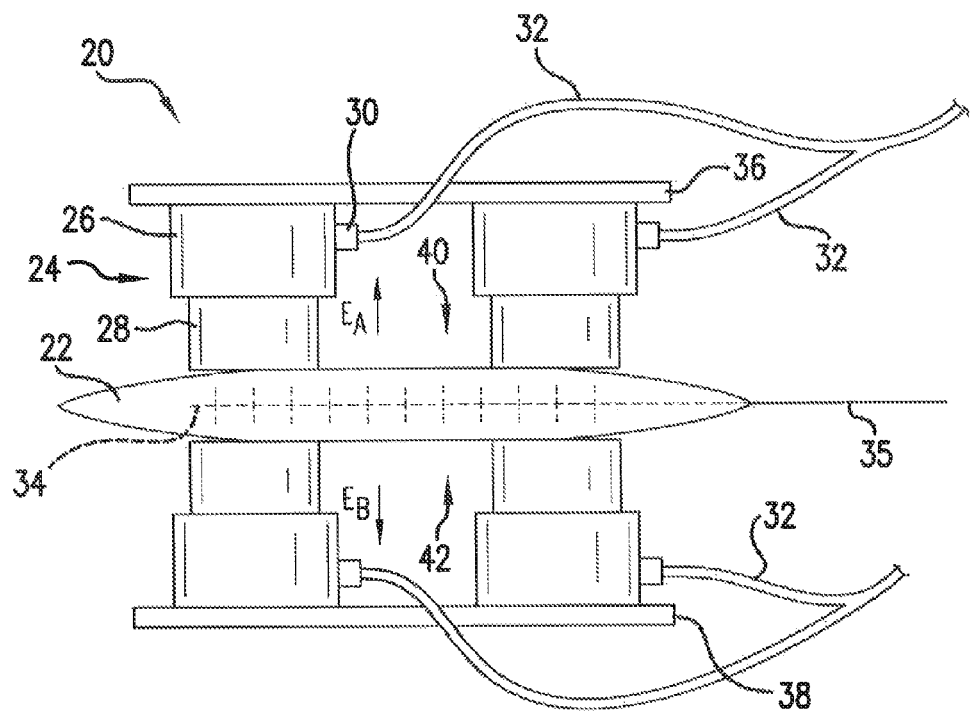
FIG. 2 provides diagrammatic view of an apparatus in accordance with an exemplary embodiment of the present disclosure, wherein the substance is in a liquid state.
Figure 3:
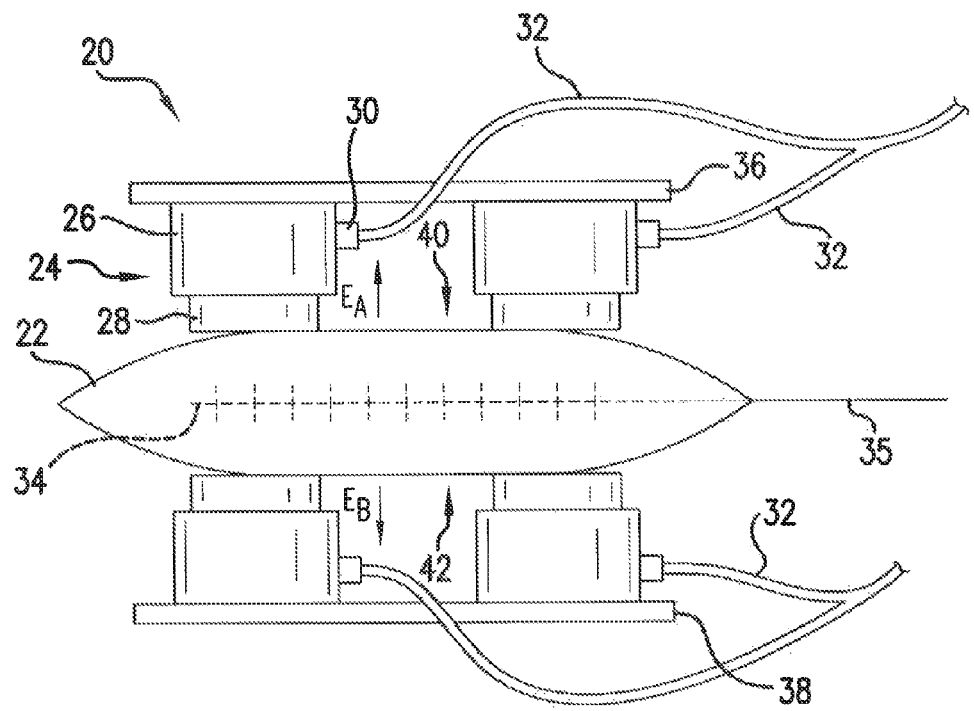
FIG. 3 provides diagrammatic view of the exemplary apparatus of FIG. 2, wherein at least a portion of the substance is in a solid state.

Referring now to the FIGS., FIG. 1 provides a diagrammatic view of a system 10 for generating electrical power using ambient conditions in accordance with an exemplary embodiment of the present disclosure, and FIGS. 2 and 3 provide close up diagrammatic views of an exemplary apparatus 20 for pressurizing one or more hydraulic lines. As shown in FIG. 1, the exemplary system 10 may generally include the apparatus 20, a hydraulic accumulator 50, and a hydraulic generator 60.

With reference to FIGS. 1-3, the apparatus 20 may generally include a first container and a second container. The first container may be a flexible container 22 configured to expand in a first direction $E_A$ and in a second and opposite direction $E_B$. The flexible container 22 may contain a substance, with the substance comprising water and defining a volume V. Accordingly, when the substance freezes, the volume V of the substance may increase and cause the flexible container 22 to expand in the first and second directions $E_A$, $E_B$. The substance may be water, or alternatively the substance may be a water solution. For example, the substance may include one or more additives to alter the freezing point of the substance. In certain embodiments, it may be desirable to alter the freezing point of the substance such that it corresponds more closely to the ambient conditions, e.g., ambient temperature, for the system 10. More particularly, it may be desirable for the freezing point of the substance to be higher than the expected ambient temperature at night and lower than the expected ambient temperature during the day time.

Additionally, for the exemplary embodiment of FIGS. 1-3, the second container may be a hydraulic cylinder 24 positioned adjacent to the flexible container 22. The hydraulic cylinder 24 may be configured to absorb at least a portion of the increased volume of the substance when the substance freezes. More particularly, the hydraulic cylinder 24 may define a body 26, a plunger 28, and a hydraulic fluid port 30. As one having ordinary skill in the art will recognize, the hydraulic cylinder 24 may contain a hydraulic fluid and as the plunger 28 is pressed into the body 26 of the hydraulic cylinder 24, a volume of hydraulic fluid corresponding the displacement of the plunger may be transferred through the hydraulic fluid port 30. Accordingly, when the flexible container 22 expands in a first direction $E_A$ or a second direction $E_B$, such as when an ambient temperature falls below the freezing point of the substance, the plunger 28 may be pressed into the body 26 and the valve 30 may transfer a corresponding volume of hydraulic fluid to the hydraulic line 32.

Moreover, as is shown in the exemplary system 10 of FIGS. 1-3, the second container of the exemplary apparatus 20 may comprise a plurality of hydraulic cylinders 24 positioned adjacent to the flexible container 22. The plurality of hydraulic cylinders 24 may be configured to absorb the expansion of the flexible container 22 along the first direction $E_A$ and the second direction $E_B$. More particularly, the exemplary apparatus 20 may include a pair of hydraulic cylinders 24 positioned adjacent to a first side 40 of the flexible container 22 configured to absorb the expansion of the flexible container 22 in the first direction $E_A$, and a pair of hydraulic cylinders 24 positioned adjacent to a second side 42 of the flexible container 22 configured to absorb the expansion of the flexible container 22 in the second direction $E_B$. Each of the hydraulic cylinders 24 may include a corresponding hydraulic fluid port 30 in communication with the hydraulic line 32 such that each of the hydraulic cylinders 24 may transfer hydraulic fluid to the hydraulic accumulator 50.

The exemplary apparatus 20 of FIGS. 1-3 may additionally include a first plate 36 and a second plate 38. The bodies 26 of the hydraulic cylinders 24 may be mounted to the first and second plates 36, 38 such that the plungers 28 are facing inwardly and abut the flexible container 22. It should be appreciated, however, that in other exemplary embodiments, the apparatus 20 may have any other suitable configuration. For example, the first and second plates 36, 38 may be rigidly connected using one or more bolts, or alternatively, the mounting plates 36, 38 may be part of a continuous "U-shaped" plate. Additionally, although the exemplary apparatus 20 of FIGS. 1-3 is shown including four hydraulic cylinders, in other exemplary embodiments, any other suitable number of hydraulic cylinders may be used. Moreover, in other exemplary embodiments, the flexible container 22 may have any other suitable shape or configuration. For example, the container 22 may be a flexible lift bag. Additionally, or alternatively, the container 22 may have a rigid or semi-rigid portion encircling its perimeter to further direct the expansion in the first and/or second directions $E_A$, $E_B$. Moreover, the flexible container 22 may include one or more rigid plates positioned between the first side 40 and the one or more hydraulic cylinders 24 and/or between the second side 42 and the one or more hydraulic cylinders 24 to ensure the expansion of the container 24 in the first and or second directions $E_A$, $E_B$ is absorbed by the hydraulic cylinders 24.

Referring specifically to FIG. 1, the apparatus 20 may be in fluid communication with the hydraulic accumulator 50 and the hydraulic generator 60 using the hydraulic line 32. More particularly, the apparatus 20 may be fluidly connected to the accumulator 50 using the hydraulic line 32 and the accumulator 50 may be fluidly connected with the hydraulic generator 60 using a pressurized line 52. The hydraulic accumulator 50 may be any device suitable for receiving and storing a substance and releasing a quantity of the substance at a desired system pressure, flow rate, or both. For example, the hydraulic accumulator 50 may be configured to receive and/or store hydraulic fluid when the pressure in the line 32 is above a minimum pressure and then to release the stored hydraulic fluid at a constant pressure, a constant flow rate, or both. Accordingly, the exemplary apparatus 20 may be sized such that the hydraulic fluid transferred to the hydraulic line 32 from the hydraulic cylinders 24 when the substance in the flexible container 22 expands is at a pressure that exceeds the minimum pressure required for the accumulator 50.

Additionally, the hydraulic generator 60 may be configured to generate electrical power using the hydraulic fluid transferred to the hydraulic line 32. For example, the hydraulic accumulator 50 may be optimized for use with the hydraulic generator 60—the hydraulic generator 60 may define an optimum pressure, speed, and/or flow volume for generating electricity, and the hydraulic accumulator 50 may be configured to provide hydraulic fluid through the pressurized line 52 at or near the optimum pressure, speed, and/or flow volume. The hydraulic generator 60 may be configured to transfer electrical power to a means for storing such electrical power, or alternatively may be configured to transfer electrical power directly to, for example, a household. An output line 62 is provided for such functionality.

Referring still to FIG. 1, the exemplary system 10 of FIG. 1 may further include a hydraulic reservoir 64 in fluid communication with the hydraulic generator 60 and the apparatus 20. More particularly, a return hose 54 may transfer fluid from the generator 60 to the reservoir 64, and a hose 56 may return fluid from the reservoir 64 to the hydraulic line 32. A check valve 58 may be provided in the hose 58 to ensure hydraulic fluid flows in a proper direction between the apparatus 20 and accumulator 50 and between the reservoir 64 and apparatus 20. More particularly, the check valve 58 may ensure fluid only flows away from the hydraulic reservoir towards the apparatus 20. In certain exemplary embodiments, the hydraulic fluid in the reservoir 64, return hose 54, and hose 56 may be substantially at an atmospheric pressure.

With continuing reference to FIG. 1, the exemplary system 10 of FIG. 1 may additionally include a heating element 34 for heating the substance within the first container, or flexible container 22. The heating element 34 may be an electrical resistance heater positioned within the first container, or flexible container 22. Moreover, for the exemplary system 10 of FIG. 1, the heating element 24 may be powered at least in part by an electrical line 35 receiving electricity generated by the hydraulic generator 60. The heating element 34 may be configured to melt at least a portion of the substance after a predetermined amount of the substance has frozen and the volume of the substance has increased.

It should be appreciated, however, that in other exemplary embodiments of the present disclosure, the heating element 34 of FIG. 1 may have any other suitable configuration. For example, the heating element 34 may be any suitable means for heating the substance within the first container, may be positioned in any suitable location to do so, and may utilize any suitable power source. For example, in other exemplary embodiments, the heating element 34 may wrap around an edge of the first container, or flexible container 22. Additionally, the heating element 34 may be configured to melt the substance based at least in part on the ambient conditions. For example, the heating element may be configured to melt the substance during the daytime when radiant energy from the sun may assist in melting the substance. In such an exemplary embodiment, the container 22 may additionally be painted a dark color so as to absorb a greater amount of radiant energy from the sun. It should also be appreciated, however, that in still other exemplary embodiments, the apparatus may not include a heating element altogether.

It should also be appreciated that in other exemplary embodiments, the system 10 of FIG. 1 may have any other suitable configuration. For example, in other exemplary embodiments, the system 10 may not include the accumulator 50 or the reservoir 64. In such an exemplary embodiment, the hydraulic line 32 may run directly to the generator 60 and the generator 60 may be configured to store the hydraulic fluid until a certain quantity and/or a certain pressure is achieved prior to generating electricity. Alternatively, however, in such an exemplary embodiment, the generator 60 may be configured to generate electricity as hydraulic fluid is received. Further, in other exemplary embodiments, the return line 54 may be configured to return the hydraulic fluid directly to the cylinders 24 after the hydraulic fluid cycles through the generator 60, or directly to the hydraulic line 32.

Additionally, in other exemplary embodiments, the system 10 may further include other elements to facilitate the freezing of the substance. For example, the system 10 may include one or more fans or a shading device. Moreover, the apparatus 20 may move between an above ground position and a below ground position to assist in the freezing and thawing, respectively, of the substance in the first container.

As use herein, the term "hydraulic fluid" may refer to any substance having properties sufficient for it to perform the desired operations discussed herein. For example, in certain exemplary embodiments, the hydraulic fluid may be any substance demonstrating properties such as non-compressibility, low freezing temperature, proper viscosity, low temperature fluidity, biodegradability, low toxicity, etc. By way of example only, in certain exemplary embodiments, the hydraulic fluid may be a water based solution, an oil based solution, etc.

Accordingly, the system 10 of FIG. 1, when utilized in an environment where the ambient conditions fall below the freezing point of the substance, may provide an affordable means for producing electricity from the ambient conditions, i.e., the ambient temperature.

Operation of the exemplary apparatus 20 of FIG. 1 may be more clearly seen with reference specifically to FIGS. 2 and 3. FIG. 2 provides a side view of the apparatus 20 with the substance in the flexible container 22 in a liquid state, while FIG. 3 provides a side view of the apparatus 20 with at least a portion of the substance in the flexible container 22 in a solid state (i.e., frozen). As shown, when the substance is in the liquid state (FIG. 2), the volume V of the substance in the flexible container 22 may be relatively small, and the plungers 28 of the hydraulic cylinders 24 may be in an extended position relative to the bodies 26 of the respective cylinders 24. By contrast, when at least a portion of the substance is in the solid state, i.e., frozen (FIG. 3), the volume V of the substance in the flexible container 22 may be increased and the flexible container 22 may have expanded in a first direction $E_A$ from the first side 40 and in an opposite second direction $E_B$ from the second side 42. Additionally, when at least a portion of the substance is in the solid state, the plungers 28 of the hydraulic cylinders 24 may have been compressed to a retracted position relative to the bodies 26 of the respective cylinders 24.

Notably, expansion of the substance as it freezes may be capable of exerting a relatively high amount of force. Accordingly, in certain exemplary embodiments, the hydraulic cylinders 24 may be configured to transfer a relatively large amount of hydraulic fluid to the hydraulic line 32 with a relatively small displacement of the plungers 28 relative to the body 26. Due to the relatively high amount for force exerted by the freezing water, the hydraulic fluid transferred to the hydraulic line 32 may still be at pressure sufficient to operate the hydraulic generator 60 or to be stored in the hydraulic accumulator 50.

Additionally, as stated, freezing of the substance in the flexible container 22 may be made possible due to the ambient temperature of the apparatus 20. Once at least a portion of the substance is frozen, any suitable means may be used for thawing out the substance such that the volume V of the substance decreases, and the flexible container 22 retracts in a direction opposite $E_A$ and $E_B$. For example, when the apparatus is used in a climate where the ambient temperature frequently rises and falls above and below the freezing point of the substance, the ambient temperature may provide for the thawing of the substance in the container. Otherwise, however, the heating element 34 may be used.

Figure 4:
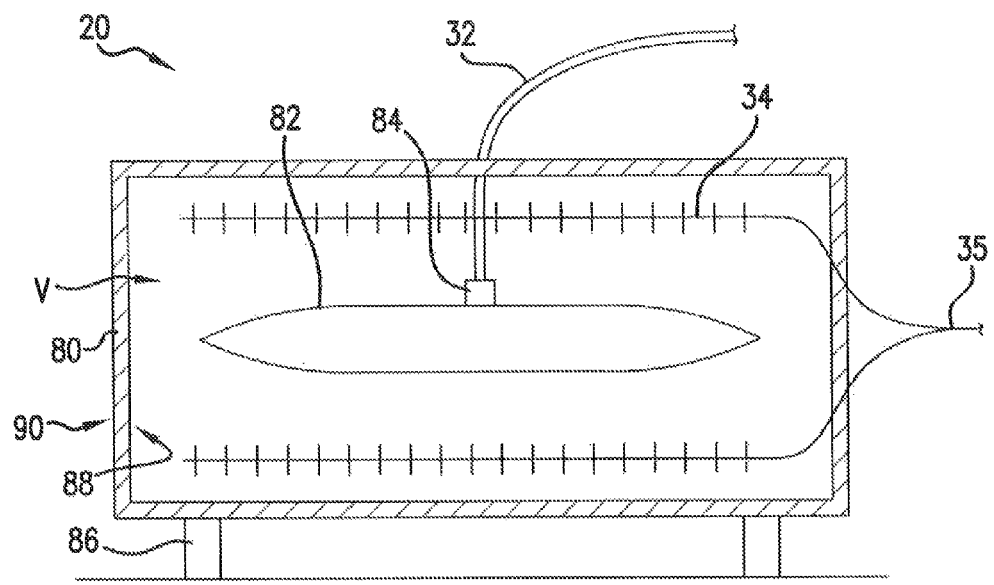
FIG. 4 provides diagrammatic view of another apparatus in accordance with an exemplary embodiment of the present disclosure, wherein the substance is in a solid state.
Figure 5:
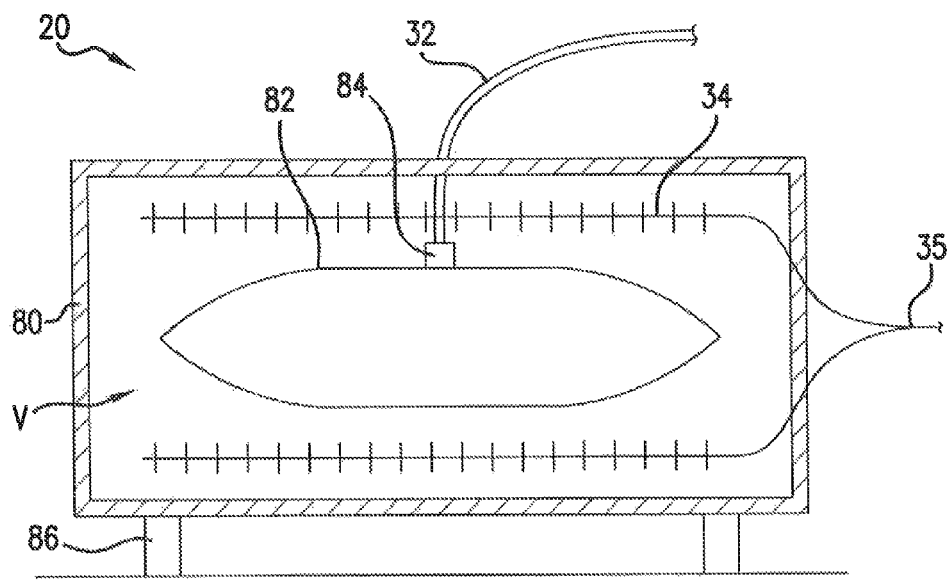
FIG. 5 provides diagrammatic view of the exemplary apparatus of FIG. 4, wherein at least a portion of the substance is in a liquid state.

Referring now to FIGS. 4 and 5, another exemplary embodiment of the apparatus 20 of FIG. 1 is provided. For the exemplary apparatus 20 of FIGS. 4 and 5, the first container may be a tank 80, and the second container may be a flexible container 82 positioned within the tank 80. More particularly, the tank 80 may be a rigid tank with a relatively fixed volume. The tank 80 may contain a substance defining a volume V, the substance comprising water, such that when the substance freezes, the volume V of the substance increases. Additionally, the flexible container 82 may be positioned within the tank 80 and include a hydraulic fluid. The flexible container 82 may therefore absorb at least a portion of the increased volume of the substance when the substance freezes. Further, the exemplary apparatus 20 may include a heating element 34 configured to melt at least a portion of the substance contained within the tank 80. For the exemplary embodiment of FIGS. 4 and 5, the heating element may be an electrical resistance heater positioned within the tank 80 and powered at least in part by electricity generated by the generator 60.

FIG. 5 depicts the apparatus 20 when the substance is in a liquid state and FIG. 4 depicts the apparatus 20 when at least a portion of the substance is in a solid state, i.e., frozen. As shown, as the substance freezes, the volume V of the substance increases. Accordingly, the relatively fixed volume of the tank 80 may require the increased volume of the substance to be absorbed by the flexible container 82. More particularly, the flexible container 82 may compress as the volume V of the substance increases, forcing the hydraulic fluid contained therein through a valve 84 and through the hydraulic line 32 such that hydraulic fluid is transferred from the flexible container 82 to the hydraulic line 32. As shown in FIG. 1, the hydraulic line 32 may be in fluid communication with the accumulator 50 and/or the generator 60.

It should be appreciated, however, that the exemplary apparatus 20 of FIGS. 4 and 5 is provided by way of example only, and in other exemplary embodiments, the apparatus 20 may have any other suitable configuration. For example, in other exemplary embodiments, the second container may instead be a plurality of flexible containers 82. In such an embodiment, the flexible containers 82 may be suspended in the substance, as is shown in FIGS. 4 and 5, and additionally, or alternatively, one or more of the flexible containers may be positioned adjacent to or attached to an inner wall 88 of the tank 80.

Moreover, in still other exemplary embodiments, the heating element 34 may have any other suitable configuration. For example, in other exemplary embodiments, the heating element 34 may be positioned on the inner wall 88 or outer wall 90 of the tank 80, and additionally, or alternatively, may be any other suitable form of heating element 34. Additionally, as discussed above, other configurations are contemplated as well.

Figure 6:
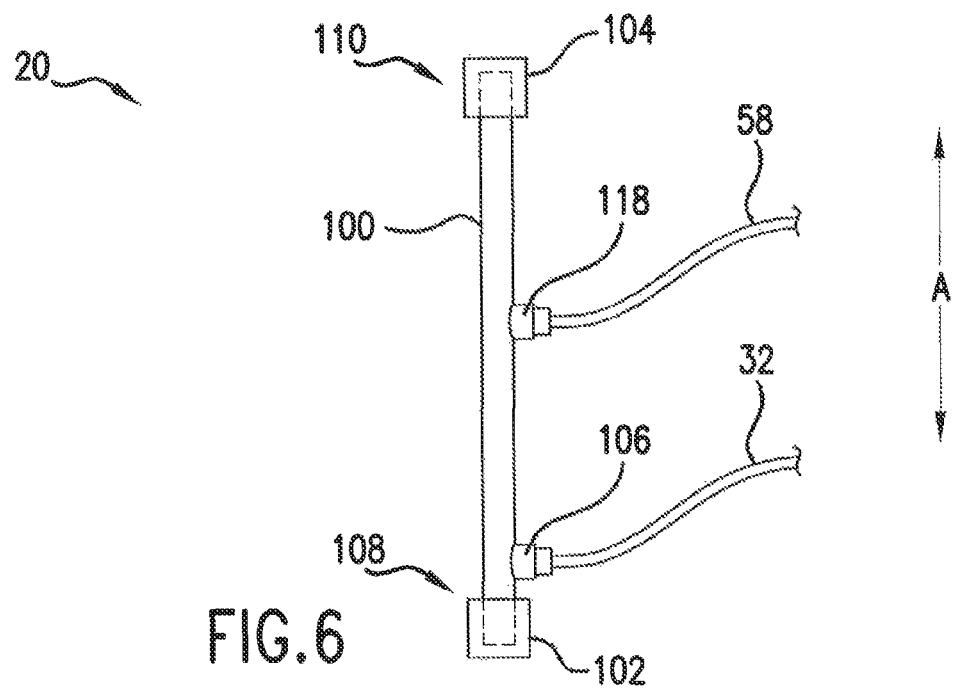
FIG. 6 provides diagrammatic view of yet another apparatus in accordance with an exemplary embodiment of the present disclosure.

With reference now to FIG. 6, yet another exemplary embodiment of the apparatus 20 of FIG. 1 is provided. The apparatus 20 of FIG. 6 includes a rigid container containing a substance, with the substance defining a volume V and comprising water. For the exemplary embodiment of FIG. 6, the rigid container may be a tube 100 defining an axial direction A and extending between a first end 108 and a second end 110. The axial direction A may correspond to the vertical direction. End caps 102 and 104 may be positioned at the first end 108 and second end 110, respectively, to seal off the tube 100. The apparatus 20 may further include a valve 106 positioned proximate to the first end 108, such that the tube 100 is in fluid communications with the hydraulic line 32. When the ambient conditions, i.e., the ambient temperature, of the apparatus 20 falls below a freezing point of the substance contained in the tube 100, at least a portion of the substance in the tube 100 may freeze, such that the volume of the substance increases, and forces a portion of the substance through the valve 106 and into the hydraulic line 32.

Notably, the positioning of the valve 106 at the first end 108 (a vertically lower end) allows the less dense frozen portion of the substance to rise within the tube 100, leaving the portion of the substance in a more dense liquid state towards the bottom of the tube 100 and capable of flowing through the valve 106 and the hydraulic line 32. Although not shown, the exemplary apparatus 20 of FIG. 6 may further include a heating element in thermal communication with the tube 100.

Still referring to FIG. 6, the exemplary apparatus 20 may be in fluid communication with hose 58. More particularly, hose 58 may be in fluid communication with the tube 100 by a valve 118. The valve 118 may be a one-way check valve to ensure fluid may only flow from the hose 58 into the tube 100.

Figure 7:
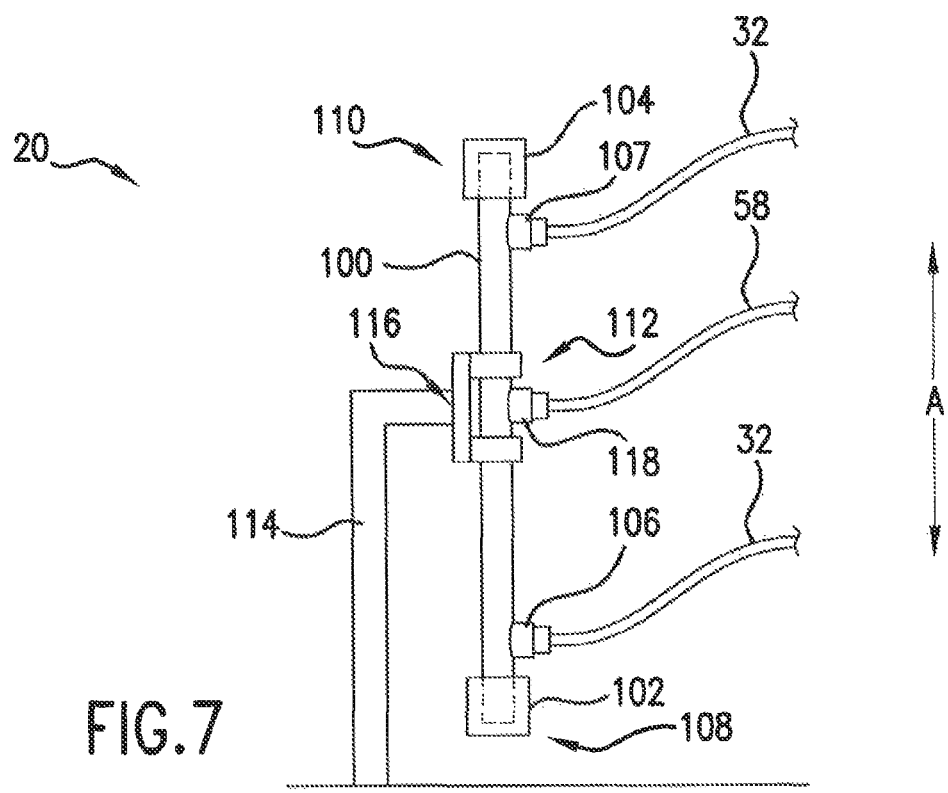
FIG. 7 provides diagrammatic view of still another apparatus in accordance with an exemplary embodiment of the present disclosure.
Figure 8:
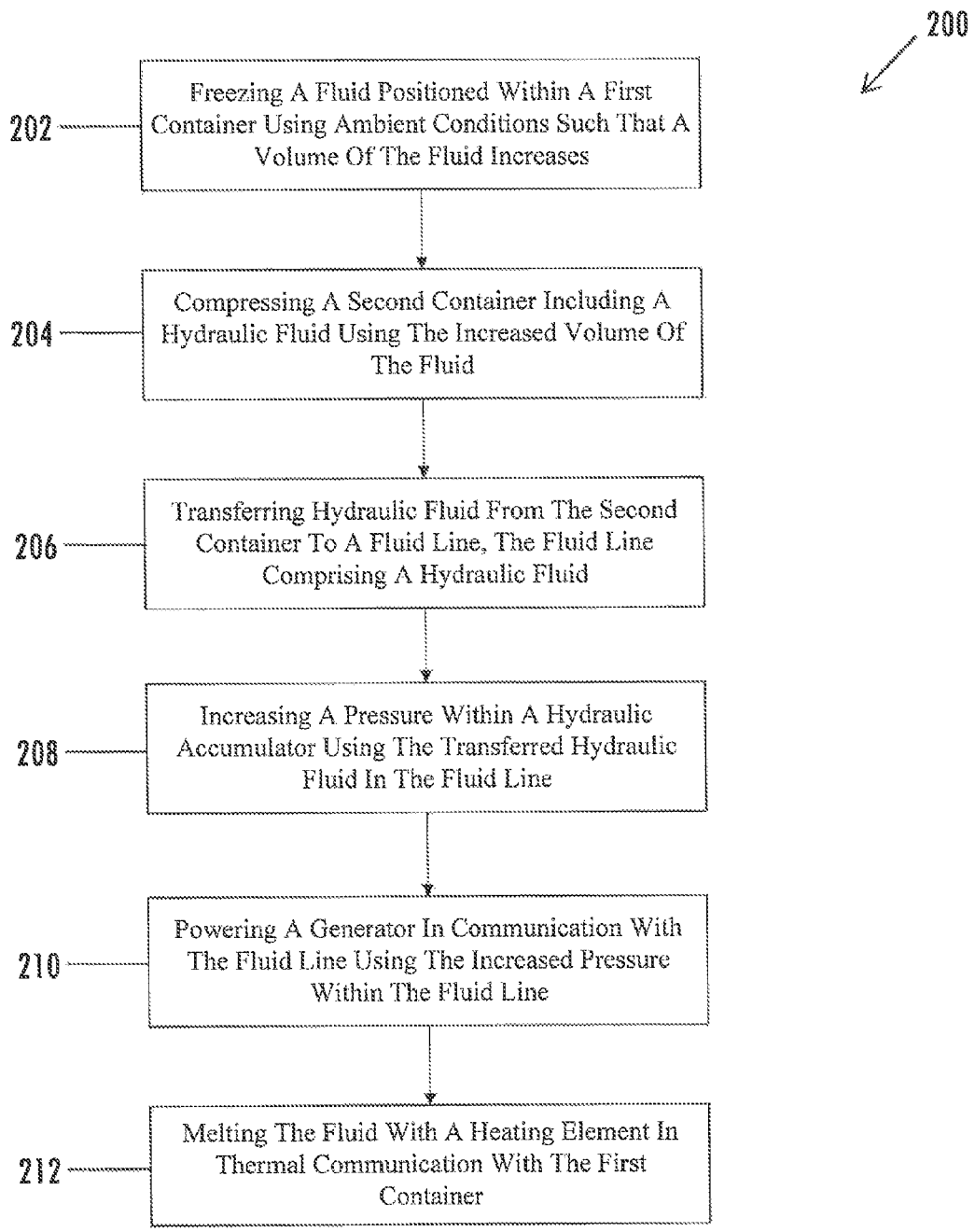
FIG. 8 provides a flow diagram of a method for generating electricity using ambient conditions in accordance with an exemplary aspect of the present disclosure.

Referring now to FIG. 7, still another exemplary embodiment of the apparatus 20 of FIG. 1 is provided. The apparatus 20 of FIG. 7 is similar to the apparatus 20 of FIG. 6, however, the apparatus 20 of FIG. 7 may further include a second valve 107 positioned proximate the second end 110 of the tube 100, and may be mounted to a stand 114 using a brace 112 and a coupling 116. The apparatus 20 of FIG. 7 may be moveable between a first position, as shown in FIG. 7, and a second position. In the first position, the first end 108 may be positioned vertically below the second end 110, while in the second position, the second end 110 may be position vertically below the first end 108. A rotating mechanism (not shown), such as an actuator, may be provided to rotate the tube 100 approximately 180 degrees about the coupling 116 between the first position and the second position.

When the tube 100 is in the first position, the second valve 107 may be in a closed position, so as to prevent the flow of a substance therethrough, and when the tube is in the second position the first valve 106 may be in a closed position to prevent the flow of a substance therethrough. The apparatus 20 of FIG. 7 may move between the first and second positions after a predetermined amount of the substance has frozen. By rotating the tube 180 degrees after a predetermined amount of the substance has frozen, the less-dense frozen portion of the substance may float from the vertically lower end to the vertically higher end, forcing the relatively warmer substance in a liquid state to interact with the relatively colder substance in a solid state (i.e., frozen). Such an interaction may allow for the melting of the substance in the solid state using less energy.

It should be appreciated, however, that in other exemplary embodiments, the apparatus 20 of FIGS. 6 and 7 may have any other suitable configuration. For example, the tube 100 may have a circular cross-sectional shape, or any other cross-section shape (e.g., squared, triangular, ovular, etc.). Additionally, the tube 100 may have any suitable aspect ratio (i.e., ratio of length to width or diameter).

One having ordinary skill in the art will readily appreciate from the teachings herein that the exemplary system 10 of FIG. 1 and the various embodiments of the apparatus 20 depicted in FIGS. 1 through 7 may provide a method (200) for generating energy, such as electrical power, using ambient conditions of the system. For example, in one exemplary aspect, the method (200) may include at (202) freezing a substance using ambient conditions such as an ambient temperature. The substance may define a volume and the volume of the substance may increase as the substance freezes. The substance may be positioned within a first container. The method (200) may additionally include at (204) compressing a second container including a hydraulic fluid using the increased volume of the substance in the first container. Further, the method (200) may include transferring hydraulic fluid from the second container to a hydraulic line in fluid communication with the second container. The hydraulic line may include a hydraulic fluid.

In certain exemplary aspects, the second container may be a hydraulic cylinder and the first container may be a flexible container configured to expand in a first direction. In such an exemplary aspect, the hydraulic cylinder may be positioned adjacent to the flexible container and may comprise a plunger and a body. Additionally, in such an exemplary embodiment, compressing the second container may comprise compressing the plunger of the hydraulic cylinder into the body of the hydraulic cylinder in the first direction as the flexible container expands.

Alternatively, in other exemplary aspects, the first container may be a rigid outer container, such as a rigid tank, and the second container may be a flexible inner container positioned within the outer container. In such an exemplary aspect, hydraulic fluid may be forced out of the flexible inner container through a valve and to a hydraulic line in fluid communication therewith as the substance in the rigid outer container freezes and the volume of the substance increases.

The method (200) may further include at (208) increasing a pressure within a hydraulic accumulator in communication with the hydraulic line using the hydraulic fluid transferred from the second container to the hydraulic line. The hydraulic fluid transferred to the hydraulic line may increase the pressure of the substance within the hydraulic line above a predetermined threshold of the accumulator for receiving hydraulic fluid.

Moreover, the exemplary method (200) may include at (210) powering a generator in communication with the hydraulic line using the increased pressure within the hydraulic line. More particularly, the generator may be fluidly connected to the accumulator, and the accumulator may be fluidly connected to the generator. Accordingly, powering the generator in fluid communication with the hydraulic line at (210) may comprise receiving with the generator hydraulic fluid from the hydraulic accumulator. Additionally, in other exemplary aspects, the method (200) may include at (212) melting the substance in the first container using a heating element in thermal communication with the first container. The heating element may be powered at least in part by the generator.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A system for generating electrical power, comprising:
a first container containing a substance, the substance defining a volume and comprising water such that when the substance freezes, the volume of the substance increases;
a second container positioned adjacent to or within the first container comprising a hydraulic fluid, the second container absorbing at least a portion of the increased volume of the substance when the substance freezes;
a hydraulic line in communication with the second container and containing a hydraulic fluid, the second container configured to transfer the hydraulic fluid from the second container to the hydraulic line when the substance freezes; and
a hydraulic generator in communication with the hydraulic line, the hydraulic generator configured to generate electrical power using the hydraulic fluid transferred to the hydraulic line;
wherein the second container is a hydraulic cylinder comprising a plunger and a body, and the first container is a flexible container configured to expand in a first direction when the volume of the substance increases, and wherein the plunger of the hydraulic cylinder is pressed into the body of the hydraulic cylinder when the flexible container expands in the first direction.

2. The system of claim 1, further comprising:
a hydraulic accumulator in fluid communication with the hydraulic line and the hydraulic generator, the hydraulic accumulator configured to receive the hydraulic fluid transferred to the hydraulic line and transfer the hydraulic fluid to the hydraulic generator at a constant pressure, a constant flow rate, or both.

3. The system of claim 1, wherein the hydraulic cylinder further comprises a hydraulic fluid port in fluid communication with the hydraulic line, and wherein the hydraulic cylinder transfers hydraulic fluid into the hydraulic line through the hydraulic fluid port when the plunger is pressed into the body.

4. The system of claim 1, further comprising:
a heating element in thermal communication with the substance in the first container, the heating element configured to melt at least a portion of the substance after the substance freezes.

5. The system of claim 4, wherein the heating element is powered at least in part by the hydraulic generator.

6. The system of claim 1, wherein the first container is further configured to expand in a second direction, and wherein the second container further comprises a plurality of hydraulic cylinders positioned adjacent to the first container, the plurality of hydraulic cylinders configured to absorb the expansion of the flexible container along the first direction and second direction.

7. The system of claim 6, wherein the flexible container defines a first side and an opposite second side, and wherein at least one hydraulic cylinder is positioned adjacent to the first side and at least one hydraulic cylinder is positioned adjacent to the second side.

8. A method for generating electrical power using ambient conditions, the method comprising:
freezing a substance using ambient conditions, the substance defining a volume and the volume of the substance increasing as the substance freezes, the substance being positioned within a first container;
compressing a second container including a hydraulic fluid using the increased volume of the substance;
transferring the hydraulic fluid from the second container to a hydraulic line, the hydraulic line including a hydraulic fluid; and
powering a generator in communication with the hydraulic line using the hydraulic fluid transferred to the hydraulic line;
wherein the second container is a hydraulic cylinder positioned adjacent to the first container, the hydraulic cylinder comprising a plunger and a body, and wherein compressing the second container comprises compressing the plunger of the hydraulic cylinder into the body of the hydraulic cylinder.

9. The method of claim 8, further comprising:
melting the substance with a heating element in thermal communication with the first container, the heating element being powered by the generator.

10. The method of claim 8, further comprising:
increasing a pressure within a hydraulic accumulator in fluid communication with the hydraulic line using the hydraulic fluid transferred to the hydraulic line; and
wherein powering the generator in fluid communication with the hydraulic line using the hydraulic fluid transferred to the hydraulic line comprises receiving with the generator hydraulic fluid from the hydraulic accumulator.

\* \* \* \* \*